United States Patent [19]
Hagen

[11] 3,850,045
[45] Nov. 26, 1974

[54] EXPANSIBLE SPROCKET FOR BICYCLES
[76] Inventor: Donald H. Hagen, 2201 Washington Ave. N., Minneapolis, Minn. 55401
[22] Filed: July 18, 1973
[21] Appl. No.: 380,210

[52] U.S. Cl................................. 74/244, 74/230.16
[51] Int. Cl............................................. F16h 35/02
[58] Field of Search.......................... 74/244, 230.16

[56] References Cited
UNITED STATES PATENTS

| | | | |
|---|---|---|---|
| 524,830 | 8/1894 | Leggo, Jr. | 74/244 |
| 724,449 | 4/1903 | Dumaresq | 74/244 |
| 724,450 | 4/1903 | Dumaresq | 74/244 |
| 740,829 | 10/1903 | Dumaresq | 74/244 |

FOREIGN PATENTS OR APPLICATIONS

| | | | |
|---|---|---|---|
| 984,401 | 4/1902 | France | 74/244 |
| 961,243 | 5/1950 | France | 74/244 |

OTHER PUBLICATIONS
Aubert, E. H., "Change Speed Devices by Means of a Wheel of Variable Diameter," 6/1/1943, pp. 1–5.

Primary Examiner—Benjamin W. Wyche
Assistant Examiner—Allan R. Burke
Attorney, Agent, or Firm—James R. Cwayna

[57] ABSTRACT

A transmission for bicycles and the like which includes a plurality of radially displaceable sprocket members with means for controlling the radial position of these sprockets members which positioning means includes a pair of plate members having reversed, identically curved paths thereon with the sprocket members mounted at the junction of the paths with means for controlling the relative speed between the two plates whereby the paths will be shifted with respect to one another and their junction point will increase or decrease radially thus moving the sprocket radially inwardly or outwardly.

4 Claims, 7 Drawing Figures

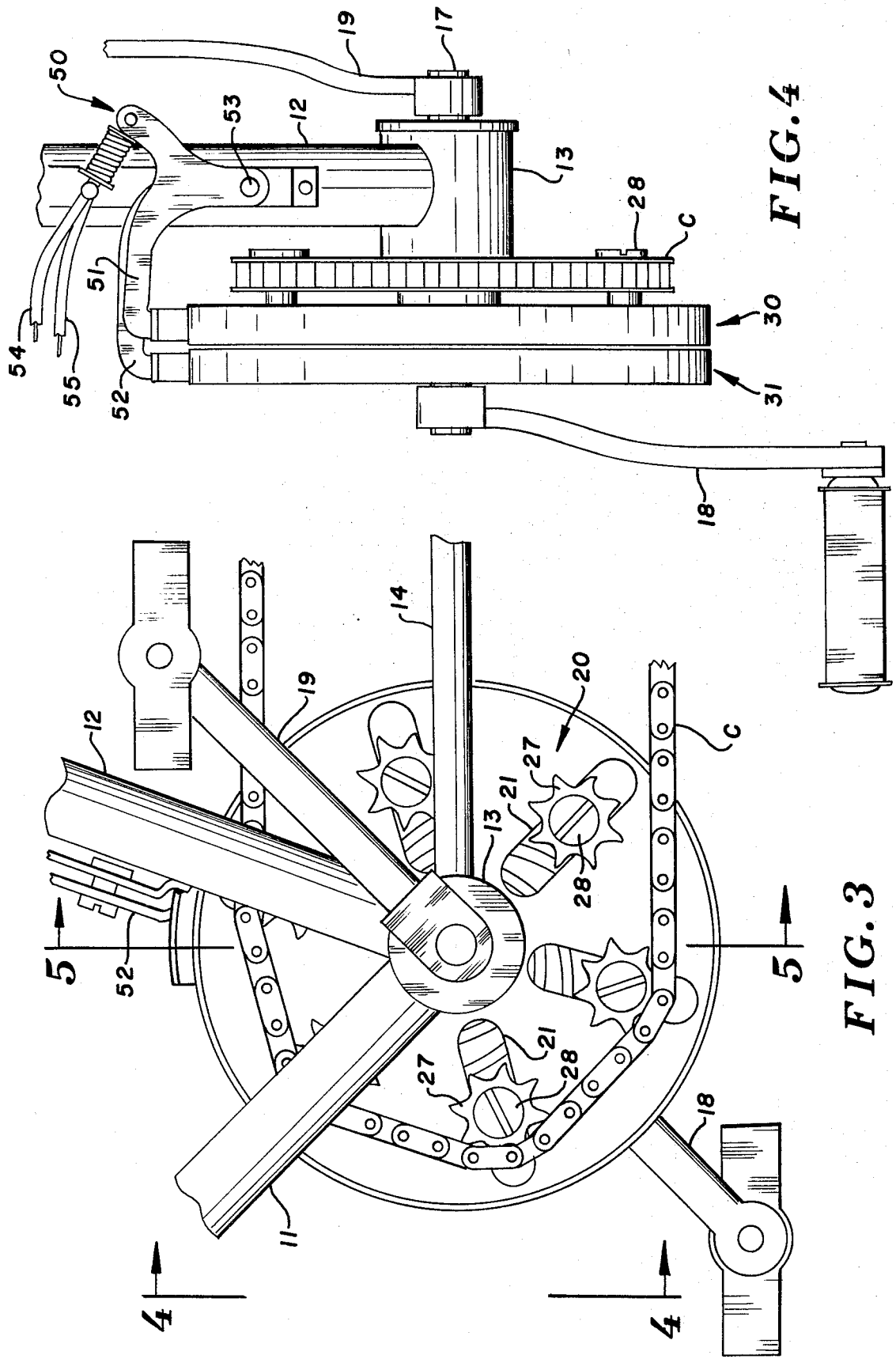

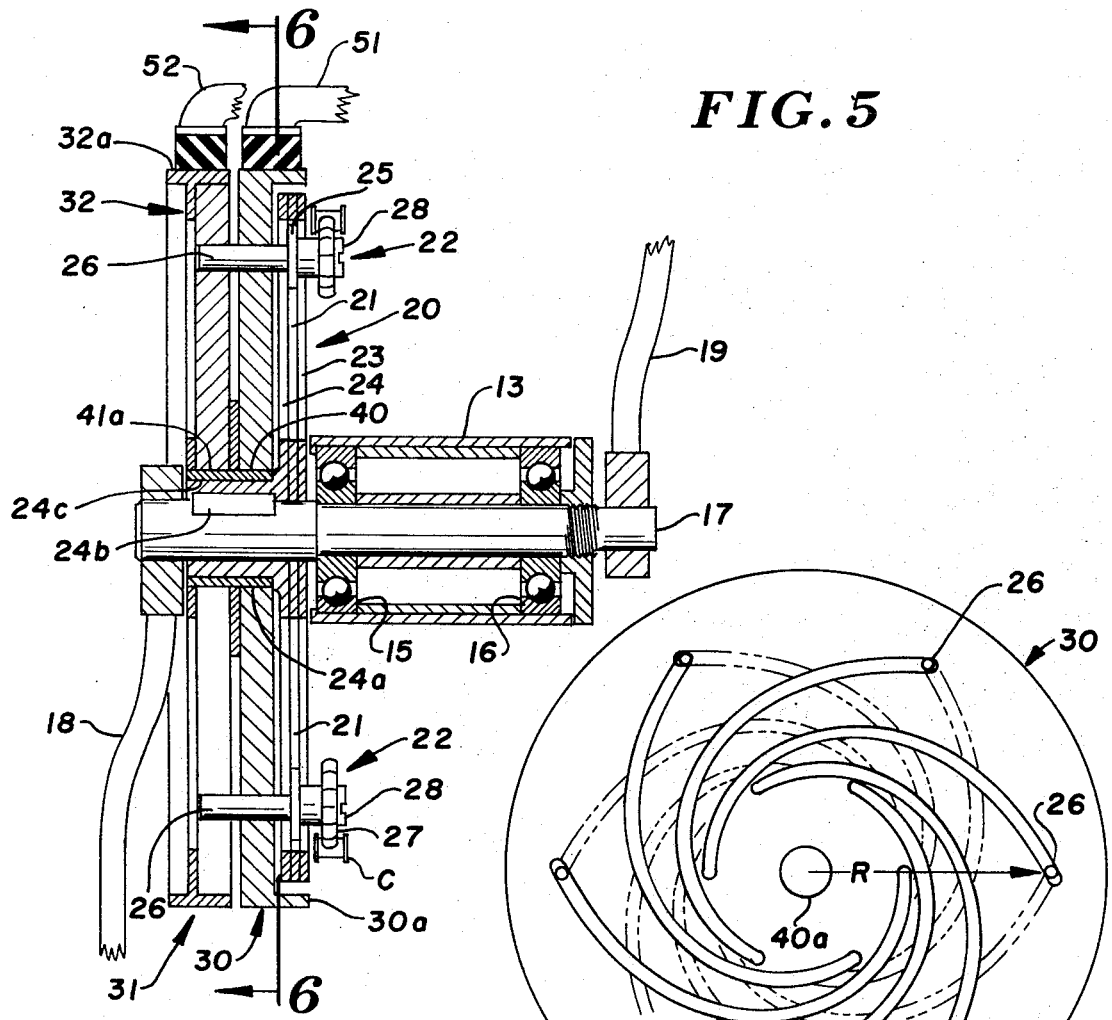
FIG. 5
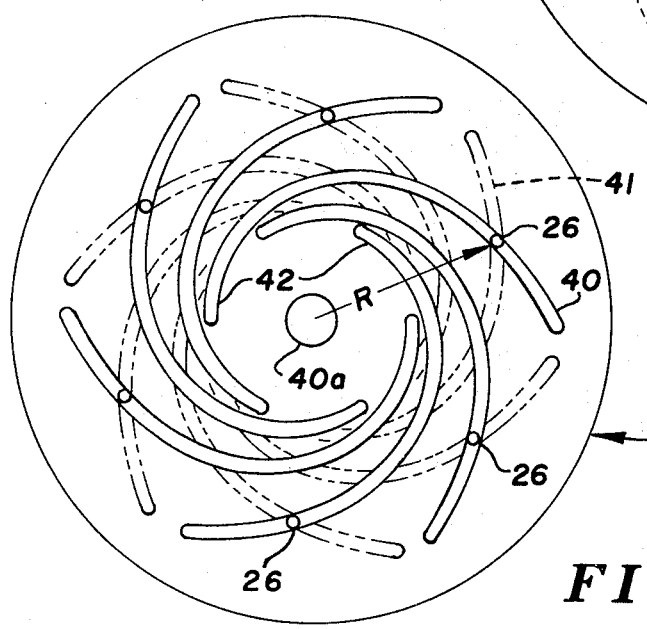
FIG. 6
FIG. 7

EXPANSIBLE SPROCKET FOR BICYCLES

Applicant has provided several previous transmission and bicycle transmissions all of which are totally capable of performing their desired function. The basic problem with the previous bicycle transmissions was that, in order to reduce the speed of the unit, or decrease the radial spacing of the individual chain drive sprockets, it was necessary to backpedal. This, although effective did present a certain use problem and with the device provided herein applicant has solved this problem.

With the bicycle transmission as disclosed herein, applicant can increase or decrease the radial location of the individual drive sprockets while continuing to pedal forwardly. This is a definite improvement over the previous concepts utilized by applicant and this application should not necessarily be limited to bicycle transmissions but should be considered to be useable in other various transmissions although a bicycle transmission is a form for showing the entire utilization of the device in a very simple situation.

It is therefore an object of applicant's invention to provide a transmission having an infinitely variable ratio while driving a positive connective mechanisms such as a chain or the like.

It is a further object of applicant's invention to provide an infinitely variable sprocket device for use in bicycle transmissions and the like wherein the variable ratios obtainable with the device are provided by increasing or decreasing the effective diameter of the drive sprocket.

It is still a further object of applicant's invention to provide a bicycle transmission or the like which includes a pair of locating plate members having opposed cirvilinear paths thereon with a common junction point and wherein a drive sprocket is mounted at such point and wherein relative rotation of the individual plates will so move the junction point of the paths that the junction point and therefore the sprocket location will radially increase or decrease.

It is a further object of applicant's invention to provide a bicycle transmission or the like wherein an infinitely variable speed change is available through selective braking of individual sprocket locating plates such that speed ratios can be altered while continually pedalling forwardly or continuing to drive the mechanism in a forward direction.

These and other objects and advantages of applicant's invention will more fully appear from the following description made in connection with the accompanying drawings wherein like reference characters refer to the same or similar parts throughout the several views, and in which:

FIG. 3 is a side view taken from the side opposite of FIG. 2;

FIG. 4 is a vertical section taken substantially along Line 4—4 of FIG. 3;

FIG. 5 is a vertical section taken substantially along Line 5—5 of FIG. 3;

FIG. 6 is a vertical section taken substantially along Line 6—6 of FIG. 5 to illustrate the control plates of the mechanism and for purposes of clarity and to illustrate the operation of the unit the path on the first such plate is illustrated in solid lines and the path on the plate directly therebehind is illustrated in dotted lines; and, FIG. 7 is a view similar to FIG. 6 illustrating the relative movement of the two plates to particularly illustrate the overlapping of the control slots of the plates and illustrating the radial shifting of the junction points between the control slots thereon.

Figure 1:
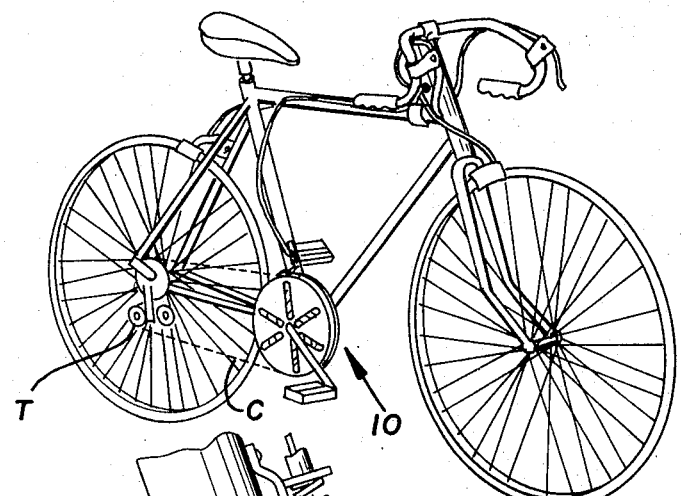
FIG. 1 is a perspective view of a bicycle having a transmission thereon embodying the concepts of applicant's invention.
Figure 2:
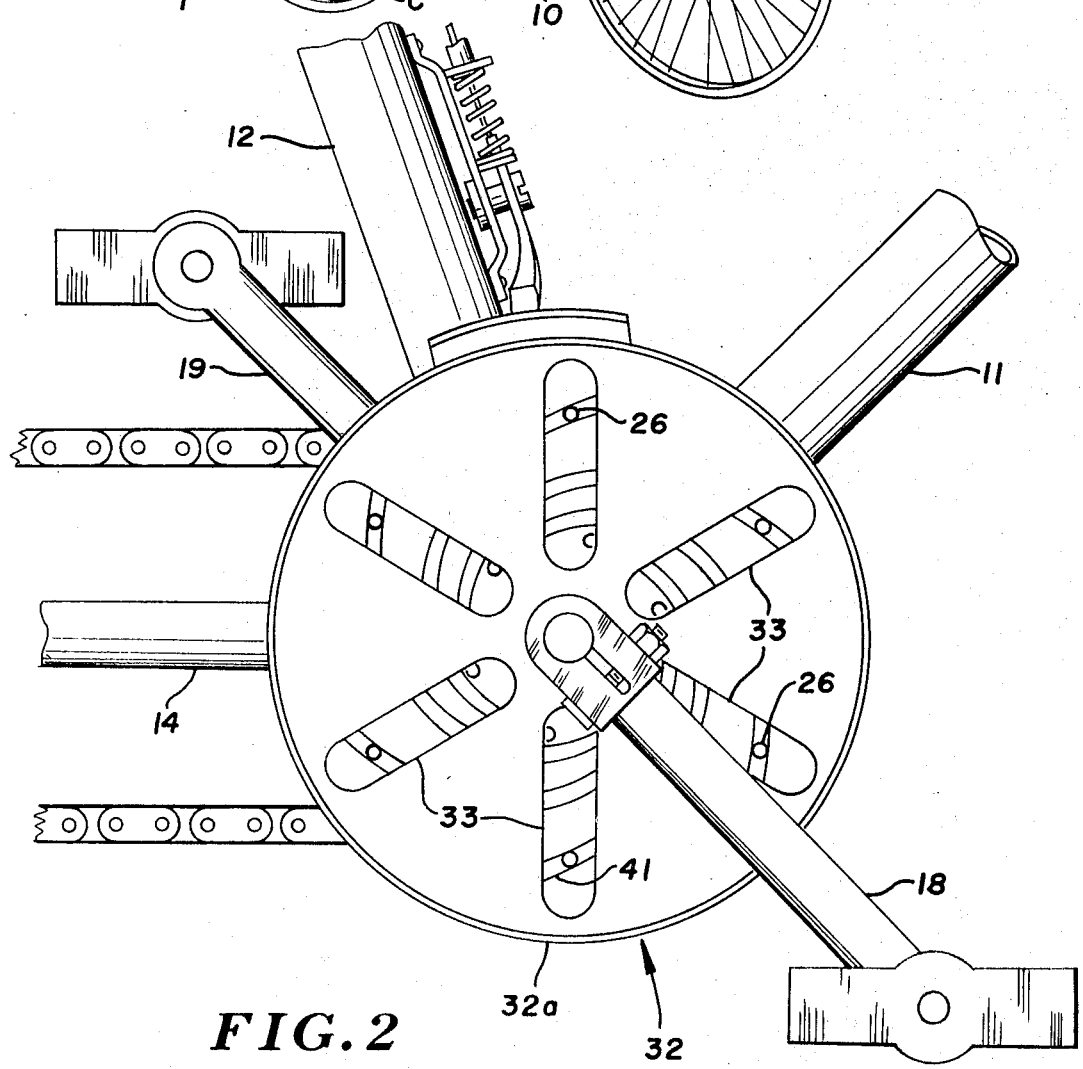
FIG. 2 is a side view of applicant's invention as utilized on the bicycle.

In accordance with the accompanying drawings, applicant's bicycle transmission is designated in its entirety 10 and is illustrated on a bicycle in FIG. 1. Obviously a chain mechanism C which is a positive drive device is utilized to connect the transmission 10 to the rear wheel and as the effective diameter of the driving sprocket of the transmission 10 will be changed during the use thereof it is necessary to provide a chain tightener T between the transmission and the rear sprocket of the bicycle. Such chain tighteners are commonly known in the art and further discussion thereof is thought to be unnecessary. In this same vein, the operation of any standard bicycle is well known in the art and applicant will limit the disclosure herein to the actual operating transmission and only those portions of the bicycle which are necessary to its operation will be included herein.

In order to install this bicycle transmission 10 the standard mounting and frame work of the bicycle are utilized. This frame includes a downwardly and rearwardly extending first frame member 11 and a second forwardly and downwardly extending which frame members join at a mounting hub 13. A further rearwardly extending frame member 14 is also normally provided and this also is illustrated herein. In FIG. 5 the hub section 13 is provided and bearings 15, 16 are illustrated therein for mounting of a main pedal shaft 17. Applicant's transmission may be mounted on any standard bicycle and the construction of the hub bearings 15, 16, shaft 17 and pedals 18, 19 as illustrated herein is taken from a readily available bicycle. In the particular form illustrated the pedals 18, 19 are connected to the main shaft 17 for driving thereof.

Applicant's transmission basically consists of a plurality of radially oriented plates with a coaction situation therebetween.

A first of these plates is designated 20 and includes a plurality of radially extending slots 21 arcuately spaced about the plate 20 and each of these slots 21 provides a means for capturing an individual sprocket member 22 therein to permit radial shifting thereof. Plate 20 may be formed from at least a pair of individual plate members designated 23, 24 with a slot 21 formed therebetween such that the sprocket members 22 may be slid radially inwardly and outwardly therein. The formation of the unit by these individual plate members 23, 24 is designed to receive a formed shoulder 25 on the shaft 26 of the sprockets 22 such that the same will be properly guided within slots 21. Obviously many forms of such a capturing arrangement may be provided.

Sprocket elements 22 include the aforementioned shaft 26 which extends rearwardly outwardly behind the guiding shoulder portion 25 such that the same may be guided by the control plates as will be discussed hereinafter.

Forwardly of the guide shoulder portion 25 individual sprocket members 27 are mounted and are captured thereon with a capturing element 28. These sprockets 27 are constructed in a form to permit one way rotation thereof such that they will always drive when the pedals are being moved in a forward direction but should the operator intend to stop pedalling the chain C will be free to override the same.

Plate 24 is provided with a hub section 24a which is arranged for driving relationship to the shaft 17 and this may be provided by a key 24b, flat or the like. This hub 24a is also provided with an exterior bearing surface 24c upon which the other plates which are the control plates may rotate.

The control plates which are designated 30, 31 will be described at this time. Each of these plates is generally arcuately formed and the first such plate 30 is provided with an inwardly directed flange 30a thereon such that the flange will substantially cover the periphery of the first radially slotted plate 20. The second plate 31 is provided with an additional cover plate 32 thereon which cover plate 32 is provided to cover the periphery thereof and to provide a circumferential braking flange 32a thereon, which flange has the same function as the aforementioned flange 30a on the first plate 30. This exterior cover member 32 is provided with a plurality of radially extending slots 33 which are basically cleanout slots and lightening slots. Obviously many of these slots 33 could be formed in plate 32 but applicant has provided 6 such slots which will correspond with the radial shifting and radial location of the sprocket shaft 26 and the location of the aforementioned slots 21 in the driving plate 20.

The coorelation and arrangement of slots to guide the sprocket shafts 26 is best illustrated in FIGS. 6 and 7. Plates 30, 31 are provided with a plurality of grooves designated 40 for the grooves in the first plate 30 and 41 in plate 31 which is directly therebehind. Central apertures 40a, 41a to be received over bearing 24c are obviously aligned and are in a position for normal free rotation about the bearing member 24c. Each of the grooves 40 on the plate 30 are provided to begin their extension from a first radially located position 42 and are arranged to extend arcuately outwardly therefrom at a predetermined increasing radial dimension to provide a curvilinear path which will reach its extremity in 180°. This particular arc configuration is a matter of choice with the major concept being that a plurality of such individual grooves 40 are provided on each of the plates 30, 31. Grooves 41 on the next adjacent plate 31 are provided in directly apposed relationship to these first grooves 40 such that they will always meet in a common junction point which is illustrated as being the location of the shaft 26 of the sprocket 22. In other words, as the plates 30, 31 are rotated relatively to one another this junction point, indicated by shaft 26, will be controlled by the crossing of the paths of the arcuates grooves 40, 41 and will move inwardly or outwardly on a direct radial line.

The particular configuration and radial increase at a predetermined rate of the grooves 40, 41 is mathematically calculated such that an infinitely variable speed control or radial location of the sprockets 22 is provided which may be altered simply by shifting the location of the sprocket control shaft 26. This radial shifting obviously is accomplished by rotating the plates 30, 31 in relation to one another.

As the plates 30, 31 are normally free for rotation about the aforementioned bearing 24c they will normally rotate along with the driven plate 20. This is obvious as the control positioning shaft 26 extends entirely through the first plate 30 and at least partially through the second plate 31. Therefore if no pressures are applied to the plates 30, 31 this shaft will drive both of them in conjunction with the normally driven plate 20.

In order to change the driving speed and the relative locations of the slots 40, 41, braking mechanism designated in its entirety 50 is provided. This braking mechanism is mounted upon a frame member such as the frame member 12 and this mechanism includes a pair of levered braking elements 51, 52. These braking elements 51, 52 are pivotally mounted upon the frame through a pivot member 53 and are controlled individually through a pair of cables 54, 55 which cable will extend up to a control position which is preferably at the handle bars of the bicycle. Normally when no speed change is desired both of these cables are untensioned and therefore no braking pressures applied. When a speed change is desired the control members arranged at the handle bar are selected to provide braking power to either of the individual plates. Upon the application of such braking power, one of the plates 30, 31 is held and the other plate being continually driven by the shaft 26 will shift therewith to follow the path described therein and therefore either increase or decrease the effective radial location of the individual sprockets 22. Although it is relatively immaterial which of teh plates 30, 31, meaning the interior or exterior thereof, will be utilized for increase or decrease in speed relationship, applicant has positioned plate 30 such that it will provide the increasing speed factor while plate 31 will provide the decreasing speed factor.

In the operation of the unit, if the user thereof desires to increase his speed he will brake utilizing brake 52 to stop the plate 31. With plate 31 being stopped plate 30 will continue to rotate along with the driving plate 20 and as illustrated in FIGS. 6 and 7, plate 30 will continue to rotate thus driving the shaft 26 radially outward in the defined path 40 as shown in the comparison of FIG. 7 to FIG. 6. FIG. 7 illustrates the pin or shaft 26 at an inner radial location and holding the plate 31 while continuing to drive the plate 30 will cause the shaft 26 to follow the outwardly directed path of the grooves 40 from the position of FIG. 7 to that of FIG. 6. When the user of the bicycle wishes to reduce the speed he will brake with lever 51 thus holding the plate 30 against movement and the plate 31 driven by the shaft 26 will displace the shaft 26 along its path 41. Thus decreasing the radial location of the shaft 26.

The use of applicant's invention then defines a dual guiding plate system unlike those systems he has previously utilized which will permit continued forward pedalling or clockwise pedalling while the speed change is be effected. Obviously the controlling grooves 40, 41 will move the sprocket shafts 26 radially inwardly and outwardly to accomplish this change and the change can be controlled at any time by simply releasing the braking mechanisms 51, 52 from either of the plates 30, 31. The purpose of clean out slots 33 should now be obvious, as the sprocket shafts 26 are moved radially inwardly and outwardly they will tend to remove any dirt that may have accumulated in these grooves 40, 41. The applicant has shown a particular braking configuration but it should be obvious that other types of braking mechanisms could be utilized to accomplish this same feature which is simply to hold one plate 30 or 31 while the other is being driven.

Applicant has illustrated a simple 180° complete increase or decrease of radial location but it should be obvious that this is not controlling and obviously may be modified to accomplish any speed change and rate of speed change that is desired. With applicant's device although it is being illustrated on a bicycle it should be obvious that it may be utilized to transmit positive power through any type of application and that is should be considered to be a transmission device rather than strictly a bicycle transmission unit.

What I claim is:

1. A transmission for bicycles or the like which includes a source of rotary power and which is designed to drive a positive connection element such as a chain, which transmission includes;
   a. first drive member connected to said rotary power source having a plurality of individual sprocket members arranged for straight line radial movement and positioning thereon;
   b. control and positioning means provided on each of said sprockets for radial positioning thereof;
   c. a first plate member having an arcuately radially increasing control path thereon and arranged to receive a selected portion of said control and positioning means therein;
   d. a second plate member having an arcuately radially increasing control path thereon in opposed relation to said control path of said first member and arranged to receive a selected portion of said control and positioning means therein;
   e. means for selectively breaking one of said first or second plate members whereby said control and positioning means will be moved along said control paths and,
   f. the control paths providing a common radially communicating path.

2. The structure set forth in claim 1 and said first plate member being arranged adjacent said drive member and normally arranged for rotation therewith and arranged for relative rotation therebetween when said braking means is applied.

3. The structure set forth in claim 1 and said first plate member being arranged adjacent said drive member, said second plate member being arranged adjacent said first plate member, said control and positioning means arranged to extend through said first plate member and at least partially through said second plate member.

4. The structure set forth in claim 3 and said drive member being provided with an extending hub, said first and second plates arranged for rotation on said hub.

* * * * *